US008483932B2

(12) United States Patent
Pursifull

(10) Patent No.: US 8,483,932 B2
(45) Date of Patent: Jul. 9, 2013

(54) FUEL DELIVERY SYSTEM CONTROL STRATEGY

(75) Inventor: Ross D. Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 922 days.

(21) Appl. No.: 12/610,089

(22) Filed: Oct. 30, 2009

(65) Prior Publication Data

US 2011/0106393 A1 May 5, 2011

(51) Int. Cl.
*G06F 19/00* (2011.01)
*G06G 7/70* (2006.01)

(52) U.S. Cl.
USPC ........... 701/102; 701/104; 123/446; 123/457; 123/497; 417/32

(58) Field of Classification Search
USPC .................. 701/101, 103, 104; 123/446, 447, 123/457, 495, 497; 417/2, 32, 43, 496
See application file for complete search history.

(56) References Cited

U.S. PATENT DOCUMENTS

| | | | | |
|---|---|---|---|---|
| 6,609,500 | B2 * | 8/2003 | Ricco et al. | 123/446 |
| 6,631,706 | B1 | 10/2003 | Yamada et al. | |
| 6,708,671 | B1 * | 3/2004 | Joos et al. | 123/464 |
| 7,350,510 | B2 | 4/2008 | Tomatsuri et al. | |
| 7,438,051 | B2 | 10/2008 | Wachtendorf et al. | |
| 2004/0074479 | A1 * | 4/2004 | Joos et al. | 123/497 |
| 2004/0112340 | A1 * | 6/2004 | Yomogida et al. | 123/497 |
| 2005/0005912 | A1 * | 1/2005 | Joos et al. | 123/458 |
| 2007/0283929 | A1 * | 12/2007 | Funabashi et al. | 123/446 |
| 2009/0090331 | A1 * | 4/2009 | Pursifull | 123/446 |
| 2009/0211556 | A1 * | 8/2009 | Smith | 123/457 |
| 2009/0276141 | A1 * | 11/2009 | Surnilla et al. | 701/103 |
| 2010/0108029 | A1 * | 5/2010 | Rollinger et al. | 123/350 |
| 2010/0274467 | A1 * | 10/2010 | Hayami | 701/103 |
| 2011/0162622 | A1 * | 7/2011 | Kojima et al. | 123/457 |

FOREIGN PATENT DOCUMENTS

| | | |
|---|---|---|
| EP | 1 275 843 | 5/2005 |

* cited by examiner

*Primary Examiner* — Willis R Wolfe, Jr.
*Assistant Examiner* — Anthony L Bacon
(74) *Attorney, Agent, or Firm* — Julia Voutyras; Alleman Hall McCoy Russell & Tuttle LLP

(57) ABSTRACT

A method for a fuel delivery system coupled to an engine is disclosed, the fuel delivery system including a lower pressure pump (LPP) fluidly coupled upstream of a higher pressure pump (HPP). The method may include during operation of both the HPP and LPP, adjusting operation of the LPP in response to pressure fluctuations at an inlet of the HPP.

18 Claims, 3 Drawing Sheets

FIG. 2
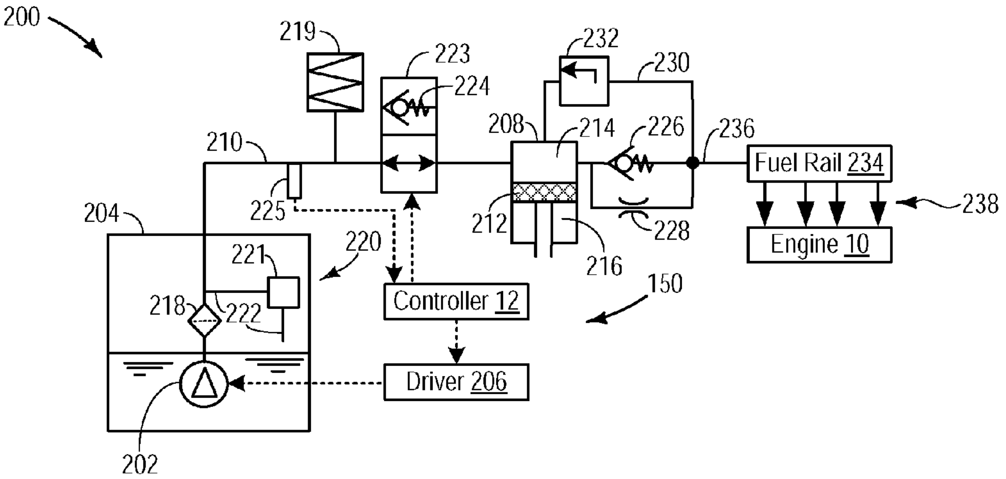
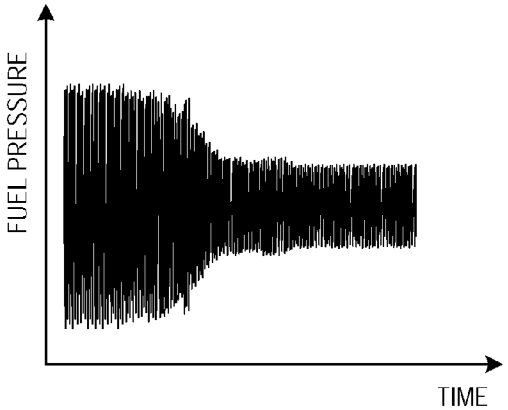
FIG. 3
FIG. 4

FUEL DELIVERY SYSTEM CONTROL STRATEGY

BACKGROUND AND SUMMARY

Engines may use Gasoline Direct Fuel Injection (GDI) systems to deliver fuel over a wide range of operating conditions to increase the combustion efficiency and decrease emissions. However, under certain operating conditions, vapor formation may occur in the fuel delivery system, which in turn may degrade engine combustion efficiency.

Various approaches have been used to decrease vapor formation. For example, in U.S. Pat. No. 7,438,051, a control strategy for decreasing the vapor in a fuel delivery system downstream of a high pressure pump is disclosed. In particular, the control strategy involves monitoring the response curve of a pressure regulator in the fuel delivery system to detect formation of vapor bubbles downstream of a high pressure pump, and subsequently adjusting the fuel delivery system to reduce the vapor in the fuel delivery system downstream of the high pressure pump.

However, the inventors herein have recognized several issues with the above approach. For example, the above approach takes mitigating action only after fuel vapor formation has occurred, and thus only after at least some degradation in combustion efficiency. Furthermore, vapor may form not only downstream of the high pressure pump, but also upstream of the pump. However, because of the positioning of the pressure regulator in the '051 reference, the pressure regulator's response curve provides no indication of such upstream vapor formation.

As such, in one approach, a fuel delivery system and method for an internal combustion engine are provided. A method for a fuel delivery system coupled to an engine is disclosed, the fuel delivery system including a lower pressure pump (LPP) fluidly coupled upstream of a higher pressure pump (HPP). The method may include during operation of both the HPP and LPP, adjusting operation of the LPP in response to pressure fluctuations at an inlet of the HPP.

Specifically, the inventors herein have recognized that pressure fluctuations at the inlet of the high pressure pump, specifically an amplitude of pressure pulsations within a certain frequency range, may be indicative of vapor formation, where a higher amplitude indicates less vapor formation, and vice versa.

In this way, the amplitude of fluctuation may serve as an indicator of vapor formation within or upstream of the higher pressure pump. Therefore, the output of the lower pressure pump may be decreased, thereby decreasing the energy consumed by the lower pressure fuel pump while decreasing the likelihood of fuel vapor development within the fuel delivery system. In particular, the method may decrease the wear on the higher pressure pump due to vaporization of fuel within and/or upstream the higher pressure pump (e.g. step-room). In some example, such as when an electronic return-less fuel system is used, the method may be implemented utilizing existing components, requiring no extra cost to implement.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 shows a schematic depiction of a fuel delivery system that may be used to supply fuel to the internal combustion engine shown in FIG. 1.

FIG. 3 shows a graph depicting the fluctuation in pressure at the inlet of the higher pressure pump.

FIG. 4 shows a graph depicting the temperature of the engine during the same time period as depicted in FIG. 3.

DETAILED DESCRIPTION

Figure 1:
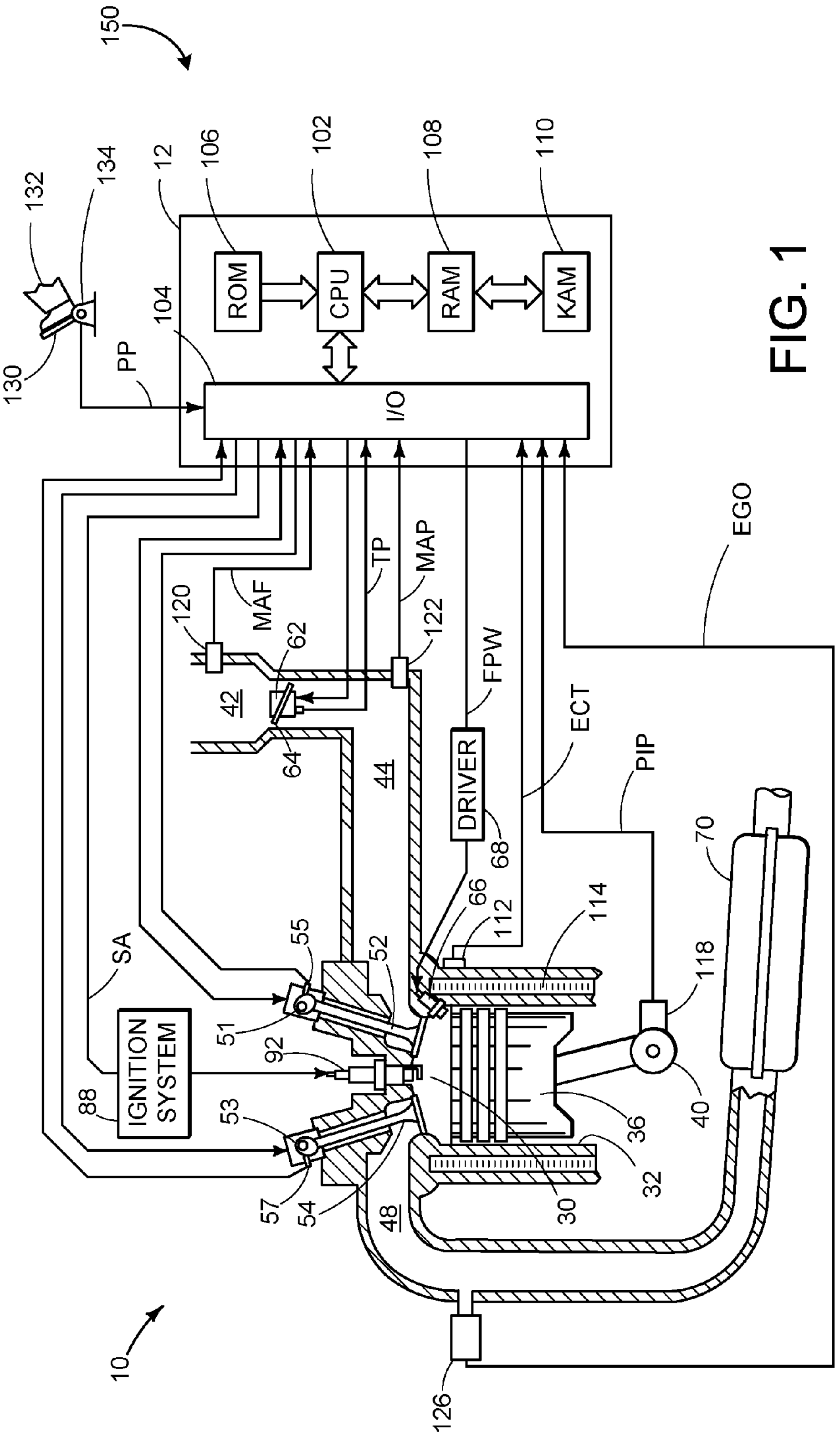
FIG. 1 shows a schematic depiction of an internal combustion engine.
Figure 5:
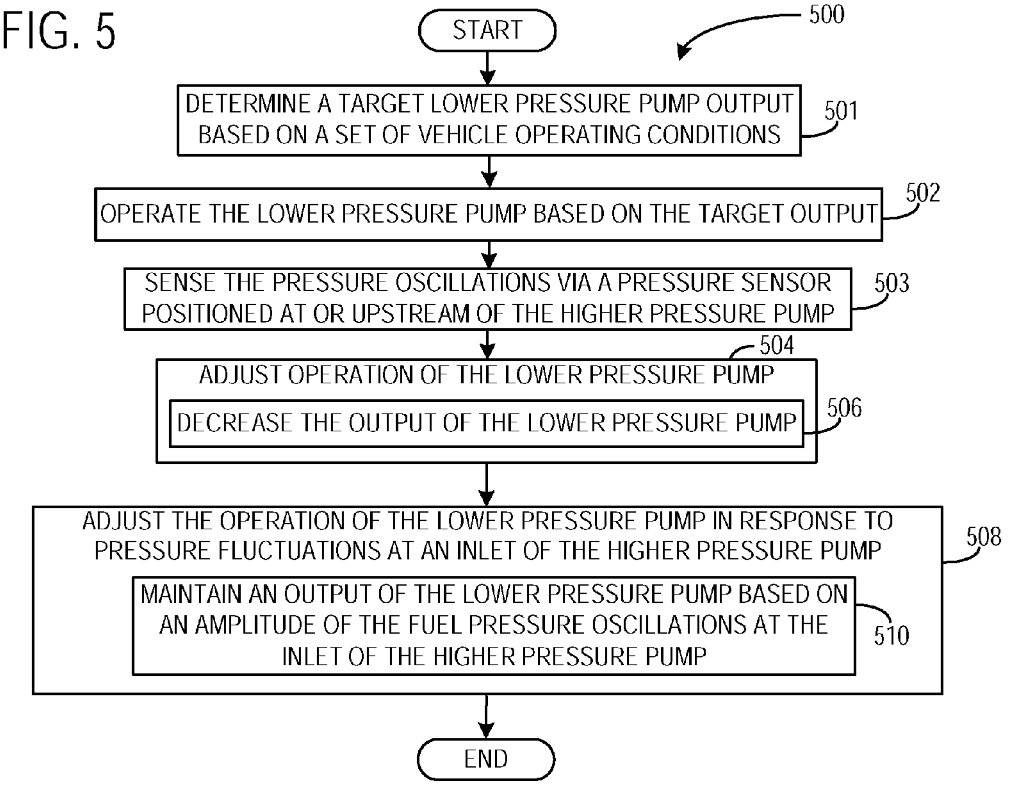
FIG. 5 is a method for a fuel delivery system that may be used to decrease vapor formation within the fuel delivery system while increasing the system's efficiency.
Figure 6:
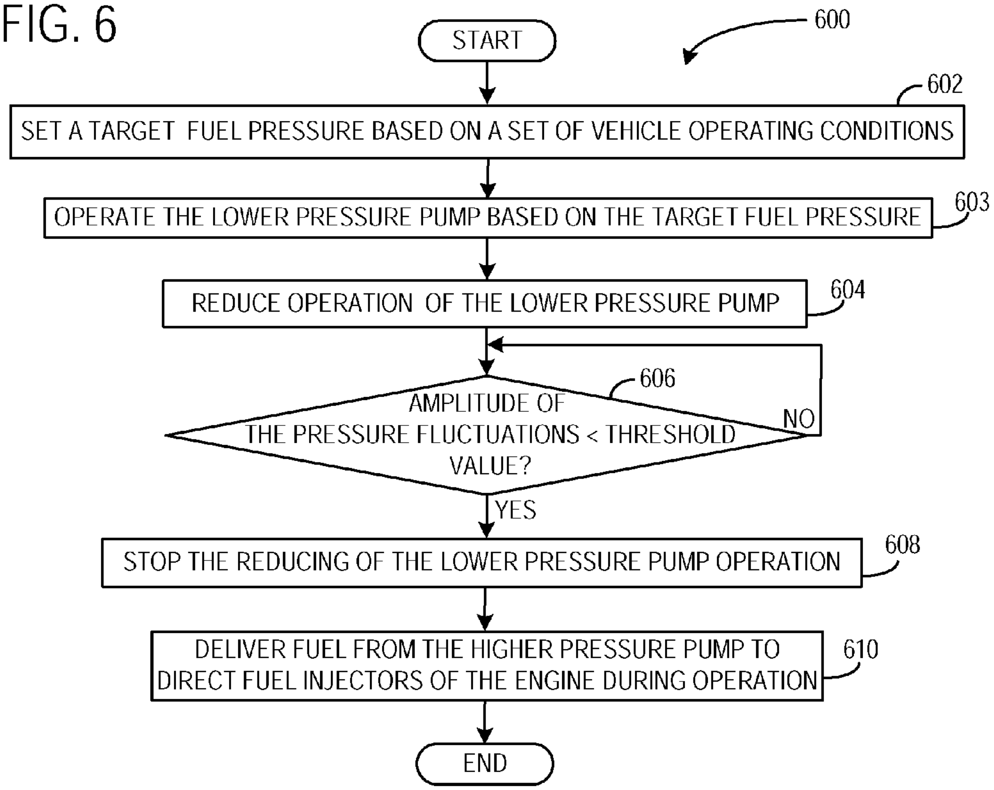
FIG. 6 is another method for a fuel delivery system that may be used to decrease vapor formation within the fuel delivery system while increasing the system's efficiency.

The present description discloses systems and methods for an engine system such as shown in FIG. 1, including an upstream a lower pressure pump and a downstream higher pressure fuel pump system as illustrated in FIG. 2. The systems and methods include adjusting an output of the lower pressure pump and higher pressure pump based on pressure fluctuations at an inlet of a higher pressure pump. In particular, as illustrated in FIGS. 3-4, pressure oscillations, at or above a given frequency, of the fuel pressure at the inlet of the higher pressure pump may be indicative of vapor formation. Thus, by monitoring the pressure oscillations, it may be possible to identify vapor generation, or the potential for vapor generation, and modify the pump operation in response thereto. For example, as illustrated in the routines of FIGS. 5-6, in response to pressure oscillations at the high pressure pump inlet, the lower pressure pump may be adjusted to reduce vapor formation. Further, various additional parameters may be considered, including fuel temperature, fuel composition, and fuel flow-rate in the fuel delivery system. In one particular example, the method may monitor pressure oscillations while decreasing output of the lower pressure pump. Then, if the amplitude of the pressure oscillations falls too low the decreasing of the lower pressure pump may be abated, or stopped, to thereby avoid or reduce vapor formation.

In this way, the amplitude of the fluctuations in fuel pressure may serve as an indicator of vapor formation within and/or upstream of the higher pressure fuel pump. Therefore, the method allows the output of the lower pressure pump to be adjusted to increase the system's efficiency while decreasing the likelihood of and possibly avoiding vapor formation within as well as upstream of the higher pressure pump. Therefore, the fuel delivery system may be operated with increased efficiency while decreasing the wear on the fuel delivery system caused by vapor formation.

FIG. 1 shows a schematic diagram showing one cylinder of multi-cylinder engine 10 is described. Engine 10 may be controlled at least partially by a control system 150 including controller 12 and by input from a vehicle operator 132 via an input device 130. The control system may further include fuel delivery system components, such as a lower pressure and/or higher pressure pump, discussed in greater detail herein with regard to FIG. 2. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein.

Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. In this example VCT is utilized. However, in other examples, alternate valve actuation systems may be used, such as electronic valve actuation (EVA) may be utilized. The position of intake valve 52 and exhaust valve 54 may be determined by position sensors 55 and 57, respectively.

Fuel injector 66 is shown arranged in the combustion chamber 30 in a configuration that provides what is known as direct injection of fuel into the combustion chamber. Fuel injector 66 may inject fuel in proportion to the pulse width of signal FPW received from controller 12 via electronic driver 68. Fuel may be delivered to fuel injector 66 via a fuel delivery system, schematically illustrated in FIG. 2 discussed in greater detail herein. It will be appreciated that additional components may be included in the fuel delivery system such as a fuel rail coupled to the fuel injector, a high pressure fuel pump, a fuel filter, etc. In some embodiments, combustion chamber 30 may alternatively or additionally include a fuel injector coupled to intake manifold 44 for injecting fuel directly therein, in a manner known as port injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Controller 12 may also be coupled to one or more pressure sensors (e.g. pressure transducers) discussed in more detail herein with regard to FIG. 2.

As described above, FIG. 1 shows only one cylinder of a multi-cylinder engine, and that each cylinder may similarly include its own set of intake/exhaust valves, fuel injector, spark plug, etc.

FIG. 2 illustrates a schematic depiction of a fuel delivery system 200. The fuel delivery system is configured to deliver fuel to engine 10 for combustion. In particular, the fuel delivery system may be configured to directly inject fuel into the cylinders in engine 10 via direct fuel injectors, as previously discussed. Thus, fuel delivery system is a gasoline direct injection (GDI) system, in some embodiments.

The fuel delivery system may include lower pressure pump 202 enclosed by a fuel tank 204. The lower pressure pump may be an electrically driven lift pump in some examples. However in other examples, another suitable lower pressure pump may be utilized such as a mechanically driven pump. A driver 206 electronically coupled to controller 12 may be used to send a control signal to the lower pressure pump to adjust the output (e.g. speed) of the lower pressure pump. Therefore, in some examples controller 12 may send a signal to the pump's electrical driver which then sends a pulse width modulation (PWM) voltage to the lower pressure pump to adjust the output of the lower pressure pump. Therefore, the lower pressure pump may be operated at a plurality of different speeds. However in other examples, other suitable techniques, devices, etc., may be used to adjust the output of the lower pressure pump. The controller, driver, lower pressure pump, as well as a higher pressure pump 208 discussed in greater detail herein may be included in control system 150.

The lower pressure pump may be coupled to higher pressure pump 208 via fuel line 210. In some examples the higher pressure pump may be a mechanically driven displacement pump and include a pump piston 212, a pump chamber 214, and a step-room 216. The step-room and pump chamber may include cavities positioned on opposing sides of the pump piston. In some examples, the pump chamber and the step-room may be exposed to substantially equivalent pressures during normal operation of the fuel delivery system. However, in other examples the higher pressure fuel pump may be another suitable fuel pump including additional or alternate components.

A fuel filter 218 may be disposed in fuel line 210 to remove particulates from the fuel, in some embodiments. Further, in some embodiments a fuel pressure accumulator 219 may be coupled to fuel line 210 downstream of the fuel filter. However in other embodiments, the fuel pressure accumulator may not be included in the fuel delivery system.

Further in some embodiments the fuel delivery system may include an electronic return-less fuel system 220 having a pressure relief valve 221 coupled to a tank-return fuel line 222 coupled between the fuel filter and the higher pressure pump and in fluidic communication with the fuel tank. The pressure relief valve may be configured to permit fluidic communication downstream of the lower pressure pump and the fuel tank when the engine is turned off and the engine transfers thermal energy to the fuel in the fuel delivery system. However in other embodiment a multi-speed mechanical return-less fuel system may be utilized. The mechanical return-less fuel system may include a fuel pressure regulator fluidly coupled to a tank-return fuel line. The fuel pressure regulator may be configured to maintain a substantially constant pressure during normal engine operation while combustion cycles are occurring.

Continuing with FIG. 2, an adjustable forward flow check valve 223 may be coupled to fuel line 210 between the fuel pressure accumulator and the higher pressure pump. The adjustable forward flow check valve may be electronically coupled to controller 12. In some examples, the adjustable forward flow check valve may be operated in two modes. A first mode in which a forward flow check valve 224, included in the adjustable forward flow check valve, is positioned within fuel line 210 configured to limit the amount of (e.g. inhibit) fuel traveling upstream of the adjustable forward flow check valve and a second mode in which forward flow check valve 224 is not positioned within the fuel line and fuel can travel upstream and downstream of the adjustable forward flow check valve. However, it will be appreciated that in other embodiments the adjustable forward flow check valve 223 may not be included in fuel delivery system 200.

A pressure sensor 225 (e.g. pressure transducer) may be coupled to fuel line 210 between fuel filter 218 and fuel pressure accumulator 219. However, in other examples the fuel pressure sensor may be coupled to an inlet of the higher pressure pump. The pressure sensor may be electronically coupled to controller 12. The pressure measured at the inlet of the higher pressure pump may be used to adjust the output of the lower pressure pump, discussed in greater detail herein. The electronic signal from pressure sensor 225 may be processed in a manner similar to that of an automotive knock sensor. For example, one or more filters may be applied to the signal from the pressure sensor to return an analog of pulsation amplitude from the pressure signal. The analog signal may be high when the pulsation amplitude is high, and low when the pulsation amplitude is low. Specifically the signal from pressure sensor 225 may be filtered by controller 12 to remove signals below a cut-off frequency. The cut-off frequency may be calculated based on a number of vehicle operating conditions, such as the ignition timing of the engine, the torque output of the engine, etc. In this way, extraneous frequencies may be removed from the signal. It will further be appreciated that different cut-off frequency may be selected based on the operating conditions of the vehicle. Unlike an engine knock signal, the fuel line pulsation frequency may be a function of pump speed. Thus, a synchronously sampled fuel rail pressure signal may be used for returning a measure of pulsation amplitude. For example, sampling the fuel rail pressure signal at 4, 8, or 16 times the pump stroke frequency may be used to provide the data needed to compute a measure of pulsation amplitude. However, it will be appreciated that in other examples, the fuel rail pressure may not be synchronously sampled.

The higher pressure fuel pump may be fluidly coupled to a forward flow check valve 226. Further in some examples, a flow limiting orifice 228 may be fluidly coupled upstream and downstream of the forward flow check valve. However it will be appreciated that in other examples, forward flow check valve 226 and/or flow limiting orifice 228 may not be included in the fuel delivery system.

A higher pressure pump return line 230 may be fluidly coupled downstream of the forward flow check valve and to the pump chamber. The higher pressure pump return line may include an electronically actuated valve 232 which may operate in at least a first mode in which fuel is substantially inhibited from traveling through the return line and a second mode in which fuel can travel through the return line. The higher pressure pump return line either serves to limit fuel rail pressure or relieves fuel rail pressure upon electronic command. However in other examples, the higher pressure pump return line 230 may not be included in the fuel delivery system.

Forward flow check valve 226 may be fluidly coupled to a fuel rail 234 via a fuel line 236. It will be appreciated that in other examples the higher pressure pump may be coupled to two or more fuel rails. The fuel rail may be coupled to a plurality of fuel injectors 238 configured to deliver fuel to engine 10. Fuel injectors 238 may include fuel injector 66 depicted in FIG. 1. As previously discussed, at least a portion of the fuel injectors may be direct fuel injectors.

During certain operating conditions, such as when the engine temperature is elevated, fuel may vaporize within the higher pressure pump. In particular, fuel within the step-room of the higher pressure pump may vaporize decreasing the lubrication or cooling within the higher pressure pump, thereby degrading operation of the pump and causing increased wear. The increased wear may lead to degradation of the pump during certain operating conditions, notably high pump speeds. The increased temperature may also lead to fuel vaporization at the inlet of the higher pressure pump. The inventors have recognized that a correlation may be drawn between a fluctuation in pressure at the inlet of the higher pressure pump and fuel vapor formation.

FIG. 3 illustrates a graph depicting the fluctuation in the fuel pressure at the inlet of the higher pressure fuel pump, where the pressure fluctuations of interest include oscillations that occur at or above a given frequency, here approximately the frequency of the fuel pump. The harmonics of the fuel pump may also be taken into account. FIG. 4 illustrates a graph of the temperature vs. time over the same time period as depicted in FIG. 3. Vaporization occurs as the volatility of the fuel increases, the pressure drops, or the temperature increases. As can be seen, the increase in temperature may be correlated to a decrease in the amplitude of the pressure fluctuation. In other words, the likelihood of vapor formations may correlate to the amplitude of the pressure fluctuations. Therefore, the amplitude of the fluctuations may serve as an indicator of vapor formation within the fuel delivery system (e.g. within or upstream of the higher pressure pump). When the amplitude of the pressure fluctuations is decreased, the likelihood of vapor formation within or upstream of the higher pressure pump is increased. Therefore, a threshold amplitude may be established. The lower pressure pump may be operated in response to variations in the amplitude to decreases and in some cases prevent vapor formation within the fuel delivery system. Thus by controlling operation of the lower pressure fuel pump with the above-described feedback signal, the energy needed to operate the lower pressure fuel pump may be decreased and in some examples minimized. Furthermore, this type of control strategy may be more effective at decreasing consumption of the lower pressure pump when compared to other control strategies which may overestimate the fuel pressure needed to reduce fuel vaporization.

Specifically in one example, controller 12 depicted in FIG. 2 may be configured to adjust the lower pressure pump based on a fluctuation in the output of fuel pressure sensor 225 at or above a cut-off frequency, during operation of the higher pressure pump. The controller may be further configured to, during adjustment of the lower pressure pump, determine a target lower pressure pump output. The target lower pump output may be determined based on one or more of: fuel temperature, fuel composition, and/or fuel flow-rate in the fuel delivery system. Still further the controller may be configured to operate the lower pressure pump based on the target lower pressure pump output, decrease the output of the lower pressure pump, and discontinue the decrease in the output based on an amplitude of the fluctuation in the fuel pressure at the inlet of the higher pressure pump, the fluctuations at or above a cut-off frequency. During certain operating conditions such as cold fuel and low flow conditions, the lower pressure pump may be completely turned off. In some examples, the discontinuation of the decrease in the output may be based on at least one of a threshold amplitude of the fluctuations in the fuel pressure and a timed rate of change of the amplitude of the fluctuation in fuel pressure. In this way, a fuel vapor formation indicator (pressure fluctuations at the inlet of the higher pressure pump) may be used to anticipate fuel vapor formation and subsequently implement actions to decrease vapor formation within the higher pressure pump. Thus, the efficiency of the lower pressure pump may be increased while decreasing the likelihood of vapor formation within the step-room thereby decreasing the wear on the higher pressure pump. It will be appreciated that the aforementioned technique is exemplary in nature and that alternate techniques may be used to decrease the likelihood of vapor formation within the higher pressure pump.

FIG. 5 shows a high level method 500 that may be used to control a fuel delivery system to decrease fuel vapor formation at the inlet of a higher pressure pump while increasing the operating efficiency of a lower pressure pump fluidly coupled to the higher pressure pump. Method 500 may be implemented by the systems and components described above. In particular method 500 may be implemented by a fuel delivery system including a lower pressure pump fluidly coupled to the higher pressure pump. The lower pressure pump may be an electrically driven pump and the higher pressure pump may be a mechanically driven displacement pump, in some examples. However, in other examples, method 500 may be implemented via other suitable systems and components. Further in some examples, method 500 may implemented during operation of a higher pressure pump.

At 501 the method includes determining a target lower pressure pump output based on a set of vehicle operating conditions. However, in other examples, a target fuel pressure at the inlet of the higher pressure pump may be determined at 501. The set of vehicle operating conditions may include one or more of engine temperature, ambient temperature, requested torque, fuel composition, fuel flow-rate, fuel pulse width, fuel injection timing, etc. In some examples, a feed-forward control module may be used to determine the target fuel pressure.

At 502 the method includes operating the lower pressure pump based on the target output. It will be appreciated that operating the lower pressure pump may include sending a PWM signal to the lower pressure pump from a driver. However, in other embodiments alternate suitable techniques may be used to operate the lower pressure pump. At 503 the method may include sensing the pressure oscillations via a pressure sensor positioned at or upstream of the higher pressure pump. However, in other examples the pressure oscillations may be calculated utilizing vehicle operating parameters or step 503 may not be included in method 500. At 504 the method includes adjusting the lower pressure pump. Further in some examples, adjusting the lower pressure pump may include at 506 decreasing (e.g. trimming) the output of the lower pressure pump. In some examples, the duty cycle supplied to the lower pressure pump may be adjusted to trim the output of the lower pressure pump.

At 508 the method includes adjusting the operation of the lower pressure pump in response to pressure fluctuations at an inlet of the higher pressure pump. The lower pressure pump may be adjusted in response to the pressure fluctuations while combustion cycles are occurring, and subsequent to an engine start in some examples. However in other examples, lower pressure pump may be adjusted during other operating conditions.

Further in some examples, the pressure fluctuations are pressure oscillations above a selectable cut-off frequency. Still further in other examples, adjusting operation of the lower pressure pump may include at 510 maintaining an output of the lower pressure pump based on an amplitude of the fuel pressure oscillations at the inlet of the higher pressure pump. Maintaining the lower pressure pump output may include discontinuing the decrease in the lower pressure pump output based on at least one of a threshold amplitude of the fluctuations in the fuel pressure and a timed rate of change of the amplitude of the fluctuation in fuel pressure. It will be appreciated that maintaining an output of the lower pressure pump may occur after the output of the lower pressure pump is decreased at 506. However in other examples, alternate strategies may be used to adjust the operation of the lower pressure pump.

In this way, operating conditions that may increase the likelihood of vapor formation at the inlet of the higher pressure pump as well as in the step-room of the higher pressure pump may be avoided. However in other examples alternate techniques may be used to modify the lower pressure pump output.

FIG. 6 shows a method 600 that may be used to control a fuel delivery system to decrease fuel vapor formation at the inlet of a higher pressure pump while increasing the operating efficiency of a lower pressure pump fluidly coupled to the higher pressure pump. Method 600 may be implemented by the systems and components described above, in some examples. However, in other examples, method 600 may be implemented via other suitable systems and components. Further in some examples, method 600 may implemented during operation of a higher pressure pump.

At 602 the method includes setting a target fuel pressure at the inlet of the higher pressure pump based on a set of vehicle operating conditions. The set of vehicle operating conditions may include one or more of engine temperature, ambient temperature, requested torque, fuel composition, fuel flow-rate, fuel pulse width, fuel injection timing, etc., as previously discussed. In some examples, the target fuel pressure may be an estimate of a required higher pressure pump inlet pressure to suppress vaporization calculated based on operating parameters. However, in other examples the target fuel pressure may be another value. At 603 the method includes operating the lower pressure pump based on the target fuel pressure. In some examples, operating the lower pressure pump based on the target fuel pressure includes adjusting the lower pressure pump based on an open-loop estimate of a required higher pressure pump inlet pressure to suppress vaporization based on operating parameters. However, it will be appreciated that in other examples alternate techniques may be used to operate the lower pressure pump based on the target fuel pressure.

Next at 604 the method includes reducing operation of the lower pressure pump. In other words, the output of the lower pressure pump may be decreased. In some examples, the reducing may be performed during an engine warm-up following an engine start, where engine coolant is below a threshold amount. However in other examples, the reducing may be performed during alternate operating conditions. At 606 the method includes determining if the amplitude of the pressure fluctuations (at or above a threshold frequency, or within a frequency window) at the inlet of the higher pressure pump is below a threshold value. In some examples, the threshold value may be determined utilizing one or more of the following parameters: fuel composition, fuel flow-rate, fuel line characteristics (e.g. flexibility, diameter, etc.). The threshold value may indicate a value below which vapor bubbles are likely to form at the inlet of the higher pressure pump.

If it is determined that the amplitude of the pressure fluctuations at the inlet of the higher pressure pump have not reached the threshold value (NO at 606) the method returns to 606. However, if it is determined that the amplitude of the pressure fluctuations at the inlet of the higher pressure pump have reached the threshold value (YES at 606) the method advances to 608 where the method includes stopping the reducing of the lower pressure pump operation. It will be appreciated that stopping the decrease in the output of the lower pressure pump may include modifying a PWM signal delivered to the lower pressure pump via a driver. In this way, the amplitude of the pressure fluctuations at the inlet of the higher pressure pump may be used in a feedback control strategy used to operate the lower pressure pump. In other words the lower pressure pump may be adjusted based on a feedback parameter calculated based on a pressure fluctuation amplitude of measured HPP inlet pressure. However in other examples, the operating conditions within the fuel delivery system of vehicle may be determined and stored when the amplitude of the pressure fluctuation reaches a threshold value. The operating conditions may include the engine temperature, the ambient temperature, the fuel flow-rate, the higher pressure pump input and output, torque demand, fuel pulse width, and injection timing. Subsequently, the stored operating conditions may be used as input values for an open loop control strategy. At 610 the method includes, delivering fuel from the HPP to direct fuel injectors of the engine during operation. After 610 the method ends.

In this way, the amplitude of the pressure fluctuations at the inlet of the higher pressure pump may be used as an indicator of vapor formation within the fuel delivery system, allowing the output of the lower pressure pump to be decreased while reducing likelihood of vapor formation within the fuel delivery system. Thus, the fuel delivery system may be operated more efficiently while decreasing the likelihood of experiencing potentially degrading conditions within the fuel delivery system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel delivery system coupled to an engine, the fuel delivery system including a lower pressure pump (LPP) fluidly coupled upstream of a higher pressure pump (HPP), comprising:

during operation of both the HPP and LPP, adjusting operation of the LPP in response to pressure fluctuations at an inlet of the HPP, wherein the pressure fluctuations are fuel pressure oscillations occurring at a frequency of the higher pressure pump or a harmonic thereof, and wherein adjusting the operation of the LPP includes maintaining an output of the LPP based on an amplitude of the fuel pressure oscillations at the inlet of the HPP.

2. The method of claim 1, wherein the adjusting of the output of the LPP is based on whether the amplitude is less than a threshold.

3. The method of claim 1, wherein the adjusting of the output of the LPP is based on a timed rate of change of the amplitude.

4. The method of claim 1, wherein the adjusting includes decreasing the output of the LPP during a first condition, and where the maintaining of the output of the LPP in response to the oscillations occurs after the decrease.

5. The method of claim 4, wherein the maintaining discontinues the decrease and the LPP is adjusted to maintain the amplitude of the pressure oscillations over a threshold value.

6. The method of claim 1, wherein the LPP is adjusted based on the fluctuations while combustion cycles are occurring, and subsequent to an engine start.

7. A fuel delivery system for an engine, comprising:
- a lower pressure pump fluidly coupled to a higher pressure pump;
- a fuel pressure sensor coupled to an inlet of the higher pressure pump; and
- a control system including a controller having code stored on memory executable via a processor, including:
  - code to adjust the lower pressure pump based on a fluctuation in the fuel pressure sensor output at or above a cut-off frequency.

8. The fuel delivery system of claim 7, wherein the control system further comprises code to, during adjustment of the lower pressure pump:
- determine a target lower pressure pump output;
- operate the lower pressure pump based on the target lower pressure pump output;
- decrease the output of the lower pressure pump; and
- discontinue the decrease in the output based on an amplitude of the fluctuation in the fuel pressure at the inlet of the higher pressure pump, the fluctuations at or above a cut-off frequency.

9. The fuel delivery system of claim 8, wherein the discontinuation of the decrease in the output is based on at least one of a threshold amplitude of the fluctuations in the fuel pressure and a timed rate of change of the amplitude of the fluctuation in fuel pressure.

10. The fuel delivery system of claim 8, wherein the target lower pump output is determined based on one or more of: fuel temperature, fuel composition, and/or fuel flow-rate in the fuel delivery system.

11. The fuel delivery system of claim 7, wherein the lower pressure pump is an electronically controlled lift pump and the higher pressure pump is fluidly coupled to a plurality of direct fuel injectors.

12. The fuel delivery system of claim 7, wherein the higher pressure pump is a mechanically driven displacement pump including a piston, a pump chamber, and a step-room, the pump chamber and the step-room positioned on opposing sides of the piston.

13. The fuel delivery system of claim 12, wherein the step-room and the pump chamber are exposed to a substantially equivalent pressure during operation of the fuel delivery system.

14. The fuel delivery system of claim 7, wherein the control system further includes code to operate the higher pressure pump to deliver fuel directly to the engine.

15. A method for a fuel delivery system coupled to an engine, the fuel delivery system including a lower pressure pump (LPP) fluidly coupled upstream of a higher pressure pump (HPP), comprising:
- during operation of both the HPP and LPP:
  - reducing operation of the LPP; and
  - stopping the reducing in response to an amplitude of pressure oscillations above a cut-off frequency falling below a threshold, the pressure oscillations at an inlet of the HPP.

16. The method of claim 15, further comprising delivering fuel from the HPP to direct fuel injectors of the engine during operation.

17. The method of claim 16, wherein the reducing is performed during an engine warm-up following an engine start.

18. The method of claim 15, further comprising sensing the pressure oscillations via a pressure sensor positioned at or upstream of the HPP.

* * * * *